Reissued May 6, 1930

Re. 17,656

UNITED STATES PATENT OFFICE

JOSEPH WILLIAM MELLOR, OF STOKE-ON-TRENT, ENGLAND

GLAZED NONVITREOUS POTTERY AND PROCESS FOR THE MANUFACTURE OF THE SAME

No Drawing. Original No. 1,666,828, dated April 17, 1928, Serial No. 81,310, filed January 14, 1926, and in Great Britain March 9, 1925. Application for reissue filed August 15, 1929. Serial No. 386,478.

This invention relates to glazed non-vitreous pottery and particularly to the manufacture of glazed porous bodied tiles and glazed porous bodied electric fittings.

It is an object of the invention to eliminate the operation known as "biscuit firing" by which the body is first "matured" previously to the second firing of the goods in a "glost kiln" after the glaze has been applied. The temperature of the "glost kiln" is considerably lower than that of the "biscuit kiln" so that there would be economy in conducting the whole of the firing in a "glost kiln".

By my invention the compositon of the body is adjusted so that the body matures at a temperature below that represented by Seger cone 01A (1080° C.). This range of temperature includes those temperatures at which the customary or normal glazes for porous bodied tiles and porous bodied electric fittings mature, that is to say, the temperature of the "glost kiln" used in this particular section of the pottery art.

When properly applied, the invention enables the biscuit firing, and all pertaining thereto, to be eliminated from the process of manufacture.

The body is modified in the required direction by using as constituents of it one or more fluxes compounded of one or more alkalies, alkaline earths, magnesia or equivalent compounds such as alkali metal carbonates, alkaline earth metal carbonates, magnesium carbonates, or silicates, borates, boro-silicates, alumino-silicates or alumino-borates of these metals. Lead compounds may also be used but for hygienic and other purposes are not desirable. The fluxes are so adjusted that when intimately mixed with the clay or other body material the body matures at the temperature of the glost kiln.

The "flux" which is added to the body is totally distinct from the flux contained in the constituents of the normal body.

It is important that the flux added to the body should be such that dehydration of the body is complete before the maturing temperature is attained; alternatively all or a part of the clays should be pre-calcined either alone or mixed with a portion of the flux or fluxes. This avoids trouble due to dehydration of the clays in the glost kiln. If the plasticity of the body is too small, it is augmented by addition of a suitable mucilage, gum or other colloid.

The invention is particularly applicable to glazed porous bodied tiles and glazed porous bodied electric fittings made by a dust process; also to articles of the character just indicated made by casting or by a pressure-moulding process. When properly applied, this enables the biscuit firing, and all pertaining thereto, to be eliminated from the process of manufacture.

The following examples illustrate the invention:—

(1) In the manufacture of glazed porous bodied tiles, the normal body material consisting of 20 parts by weight of ball clay, 20 parts of china clay, 44 parts of flint and 16 parts of stone, is mixed, preferably in the grinding mill, with 2¼ per cent of its weight of a mixture of 1 part of calcium or magnesium borate (commercial borocalcite or boracite) and 2 parts of sodium silicate rich in silica ($Na_2O:SiO_2=1:3$). The body thus made is well suited for a normal tile glaze which matures at the temperature not exceeding Seger cone 01A (1080° C.). The tile having been formed from the body by a dust process, is coated with the glaze and then fired at the said temperature in the manner usual in operating the glost kiln.

(2) A body suitable for glazed porous bodied electric fittings containing 36 parts by weight of ball clay, 12 parts of china clay, 2 parts of flint, 31 parts of felspar and 19 parts of stone, is intimately mixed with 2½ per cent of its weight of a flux consisting of a mixture of one part of calcium borate and two parts of sodium silicate as indicated above. The fittings fashioned from this body are coated with a glaze which matures at a temperature represented by Seger cone 01A (1080° C.), and are fired in the glost kiln at this temperature.

It will be understood from the above that by the use of my invention, I am enabled to provide a composition or body which may be matured at the reduced temperature required for the maturing of the glaze with which it is to be coated; that my new flux is of such a character that the particles thereof will retain their position in the intimate mixture thereof hereinabove described with the aforesaid normal body material notwithstanding the conventional treatments to which said body is subjected, these particles of flux being partially soluble or soluble only at the surface thereof; that the new flux may be adjusted to so toughen the green unfired body without excessive decomposition by the action of water in the mixing that application of the glaze to this usually friable green unfired body may be accomplished without excessive breakage; that I am enabled to avoid unequal contraction, blistering and distortion of the body by "bowing" and that I am also enabled to avoid curling and frizzling of the glaze, a curdling of the colours and a separation during filter pressing of soluble matter from the body containing my flux.

It will also be obvious that though a body made in accordance with my invention still retains its porous or non-vitreous character after firing, the products of reaction formed during the firing will make the body and glaze more analogous or like one another than is the case with the normal biscuit fired body and consequently the body and glaze will harmonize with each other so as to produce a better bond and lessen the risks of "crazing" and shivering, thus resulting in an improved product.

Having thus fully described the nature of the said invention and the best means I know of carrying the same into practical effect, I claim:—

1. A process for the manufacture of glazed non-vitreous pottery and particularly glazed porous bodied tiles and glazed porous bodied electric fittings which consists in forming the body of the usual composition, adding thereto a flux which acts at a temperature below that represented by Seger cone 01A (1080° C.) and in quantity not exceeding the equivalent of 3% of the weight of the unfired body, applying to the unfired body a glaze normal for making glazed porous bodied tiles glazed porous bodied electric fittings, and firing the product in a glost kiln.

2. A process for the manufacture of glazed non-vitreous pottery and particularly glazed porous bodied tiles and glazed porous bodied electric fittings which consists in forming the body of the usual composition with addition of a flux consisting of calcium borate and alkali silicate rich in silica, this flux being added in such proportion that the body matures at a temperature below the limit represented by Seger cone 01A (1080° C.), applying to the unfired body a glaze normal for making glazed porous bodied tiles or glazed porous bodied electric fittings, and firing the product in a glost kiln.

3. A process for the manufacture of glazed non-vitreous pottery and particularly glazed porous bodied tiles and glazed porous bodied electrical fittings which consists in forming the body of the usual composition with addition of a flux consisting of calcium borate and alkali silicate, rich in silica, this flux being added in proportion amounting to not more than 3 per cent of the weight of the unfired body, applying to the unfired body a glaze normal for making glazed porous bodied tiles or glazed porous bodied electric fittings, and firing the product in a glost kiln.

4. A process for the manufacture of glazed non-vitreous pottery which consists in modifying the composition of the normal body material by a flux to cause the said body and the normal glaze to mature at the same temperature which is below that temperature at which the said body normally matures.

5. A process for the manufacture of glazed non-vitreous pottery which consists in taking a clay composition usual for the manufacture of a non-vitreous "biscuit" body, adding thereto a flux which acts to reduce the normal maturing temperature of said composition to a temperature at which a glaze normal for the glazing of non-vitreous pottery matures, forming said clay body, applying said glaze to the formed and unfired clay body, and subjecting said glazed body to a maturing firing.

6. A process for the manufacture of glazed non-vitreous pottery which consists in taking a normal body of clay composition usual for the manufacture of a non-vitreous "biscuit" body, adding thereto a foreign flux distinct from any flux contained in the said normal body so adjusted in relation to said body as to cause the normal maturing temperature of said composition to be reduced to the normal maturing temperature of a glaze for said non-vitreous pottery, forming said body, applying said glaze to the green unfired body so formed, and subjecting said glazed body to the maturing temperature of the glaze by firing in a glost kiln.

7. A process for the manufacture of glazed non-vitreous pottery which consists in taking a clay composition usual for the manufacture of a non-vitreous "biscuit" body, adding thereto a flux the products of reaction of which under firing will be more analogous to the glaze to be applied than are the reaction products of the normal body materials, forming the body, applying said glaze to the green unfired body so formed, and subjecting said glazed body to the maturing temperature of the glaze by firing in a glost kiln.

8. A process for the manufacture of glazed non-vitreous pottery which consists in taking a clay composition usual for the manufacture of a non-vitreous "biscuit" body, adding thereto a flux of a character that the particles will intimately mix with the normal body materials and retain their intimate relationship throughout the conventional treatments to which such compositions of normal body materials are subjected, said flux being so added in such adjusted quantity in relation to said body as to cause the normal maturing temperature of said composition to be reduced to the normal maturing temperature of a glaze for said non-vitreous pottery, forming said body, applying said glaze to the green unfired body so formed, and subjecting said glazed body to the maturing temperature of the glaze by firing in a glost kiln.

9. A process for the manufacture of glazed non-vitreous pottery which consists in taking a clay composition usual for the manufacture of a non-vitreous "biscuit" body, adding thereto a temperature-reducing flux in such adjusted quantity that the body will mature at the maturing temperature of the glaze to be applied, forming said body, applying said glaze to the green unfired body so formed, and subjecting said glazed body to the maturing temperature of the glaze by firing in a glost kiln.

10. An article of glazed non-vitreous pottery comprising a body composed of the fired reaction products of a clay composition normal for the manufacture of non-vitreous biscuit tile modified by the addition thereto of a flux of a vitreous character analogous to a glaze, and a surface layer of said glaze on said modified body, whereby an article having a bond of increased strength between said glaze and modified body is produced.

11. An article of glazed non-vitreous pottery comprising the fired reaction products of a modified body, comprising a body composition normal for the manufacture of a non-vitreous biscuit tile intimately mixed a flux of a character more vitreous than said normal body, and a surface layer of vitreous glaze on to said body, whereby an article having a bond between the body and glaze of increased strength and homogeneity is provided.

12. An article of glazed non-vitreous pottery comprising the fired reaction products of an intimate mixture of a body normal for the manufacture of a non-vitreous biscuit tile having added thereto a foreign flux distinct from any flux contained in the said normal body of a character more vitreous than said body and in an adjusted quantity capable of causing said body to mature at substantially the same temperature as a glaze, and a surface layer of said glaze on said body, whereby an article having a bond of increased strength and homogeneity is provided.

In testimony whereof, I have signed my name to this specification.

JOSEPH WILLIAM MELLOR.